United States Patent
Fillion et al.

(10) Patent No.: US 7,832,792 B2
(45) Date of Patent: Nov. 16, 2010

(54) STRUCTURAL UNITS ADAPTABLE TO PREEXISTING CHASSIS AND VEHICLE ASSEMBLED THEREFROM

(75) Inventors: Pascal Fillion, St. Charles de Drummond (CA); Jimmy Garand, Drummondville (CA); Carl Charest, Drummondville (CA); Jean Bessette, Blainville (CA); Michel Blier, Montreal (CA); Francois Gaucher, Montreal (CA); Jean-Francois Lebeuf, Brossard (CA)

(73) Assignee: Corporation Micro Bird Inc., Drummondville, Quebec (CA)

( * ) Notice: Subject to any disclaimer, the term of this patent is extended or adjusted under 35 U.S.C. 154(b) by 515 days.

(21) Appl. No.: 11/589,452

(22) Filed: Oct. 30, 2006

(65) Prior Publication Data

US 2007/0102958 A1    May 10, 2007

Related U.S. Application Data

(60) Provisional application No. 60/730,863, filed on Oct. 28, 2005.

(51) Int. Cl.
    *B60J 1/00* (2006.01)
(52) U.S. Cl. .................. 296/178; 296/203.01
(58) Field of Classification Search ............... 296/178, 296/121, 193.02, 210, 118, 203.01
    See application file for complete search history.

(56) References Cited

U.S. PATENT DOCUMENTS

| | | | | |
|---|---|---|---|---|
| 1,694,572 A | * | 12/1928 | Weymann | 296/203.01 |
| 1,868,263 A | * | 7/1932 | Weymann | 296/203.01 |
| 1,880,844 A | * | 10/1932 | Curtiss | 296/182.1 |
| 2,070,613 A | * | 2/1937 | Norbom | 410/91 |
| 2,205,640 A | * | 6/1940 | Wendt | 296/210 |
| 2,303,580 A | * | 12/1942 | Reid | 296/30 |
| 2,604,671 A | * | 7/1952 | Sherman et al. | 52/63 |
| 2,846,262 A | * | 8/1958 | Ray | 296/161 |
| 4,221,426 A | * | 9/1980 | Wardill | 296/178 |
| 4,230,361 A | * | 10/1980 | Nachbur et al. | 296/30 |
| 4,274,190 A | * | 6/1981 | Slattery | 29/401.1 |
| 4,283,086 A | * | 8/1981 | Morin | 296/178 |
| 4,582,354 A | * | 4/1986 | Halim | 296/64 |
| 4,773,701 A | * | 9/1988 | Messori | 296/178 |
| 5,577,793 A | * | 11/1996 | Kobasic | 296/146.4 |
| 5,690,378 A | * | 11/1997 | Romesburg | 296/181.3 |
| D388,744 S | * | 1/1998 | Pfannenstiel et al. | D12/84 |
| 6,224,144 B1 | * | 5/2001 | Veit-Salomon et al. | 296/203.03 |
| 6,273,497 B1 | * | 8/2001 | Devallez et al. | 296/203.01 |
| 6,523,883 B1 | * | 2/2003 | Bergstrom et al. | 296/184.1 |
| 6,615,549 B1 | * | 9/2003 | Hodge et al. | 52/7 |
| 6,685,254 B2 | * | 2/2004 | Emmons et al. | 296/178 |
| 7,077,459 B2 | * | 7/2006 | Toth et al. | 296/178 |
| 7,097,232 B2 | * | 8/2006 | Beaudry et al. | 296/178 |
| 7,305,766 B1 | * | 12/2007 | Timmermans | 29/897.2 |
| 7,427,096 B2 | * | 9/2008 | Snider et al. | 296/146.16 |
| 7,523,978 B1 | * | 4/2009 | Timmermans et al. | 296/178 |
| 2005/0161975 A1 | * | 7/2005 | Nieminski et al. | 296/178 |
| 2005/0212330 A1 | * | 9/2005 | Nieminski et al. | 296/191 |
| 2006/0273623 A1 | * | 12/2006 | Romano | 296/178 |
| 2006/0273624 A1 | * | 12/2006 | Romano | 296/178 |

\* cited by examiner

*Primary Examiner*—Kiran B. Patel
(74) *Attorney, Agent, or Firm*—Ladas & Parry LLP

(57) ABSTRACT

A structural unit comprising an assembly of bows longitudinally spaced and secured together by structural members, which is easily and rigidly assembled by using sliding connections of extrusions, for subsequent fitting to a range of preexisting chassis, to yield specific vehicles.

11 Claims, 9 Drawing Sheets

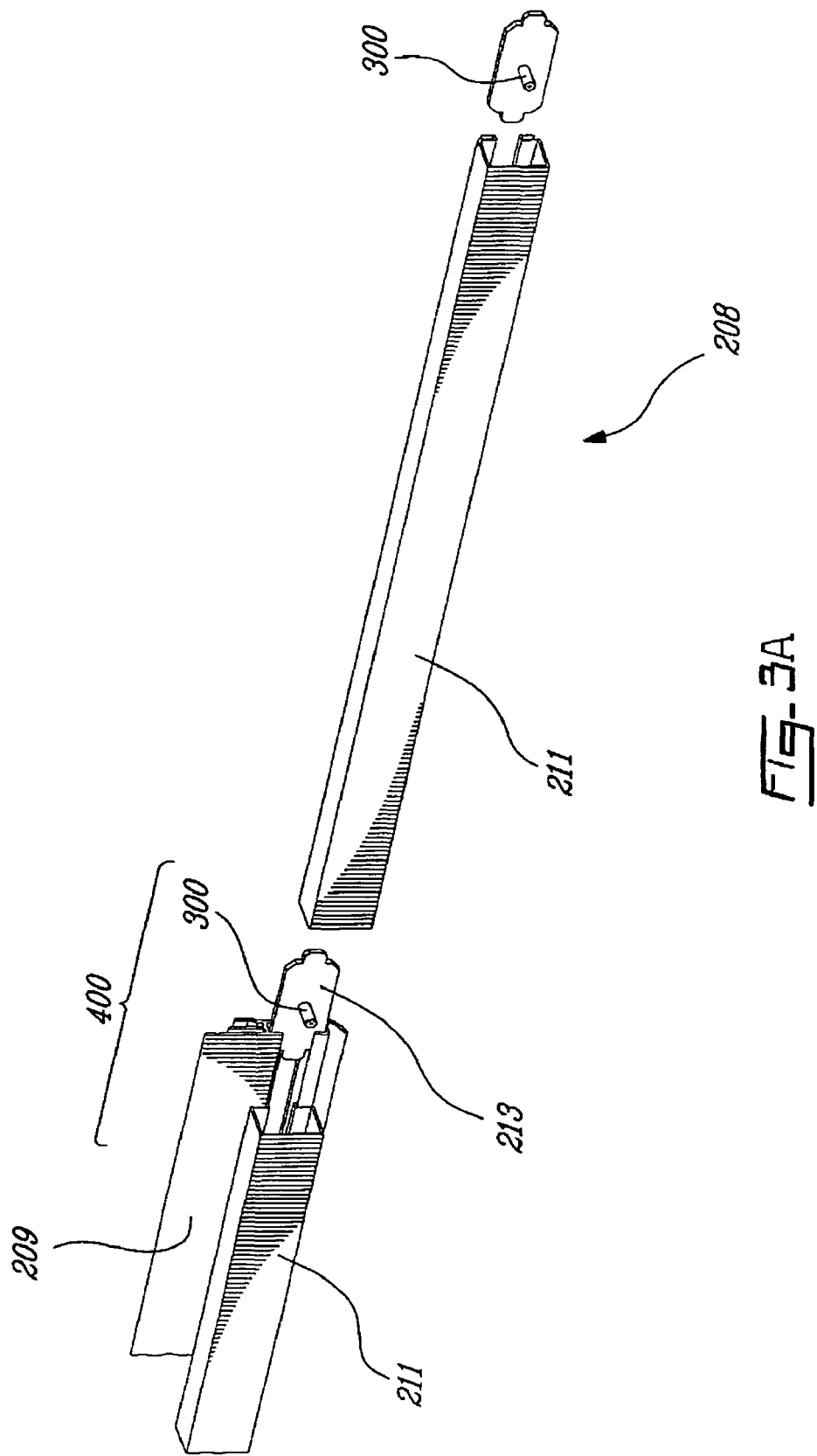

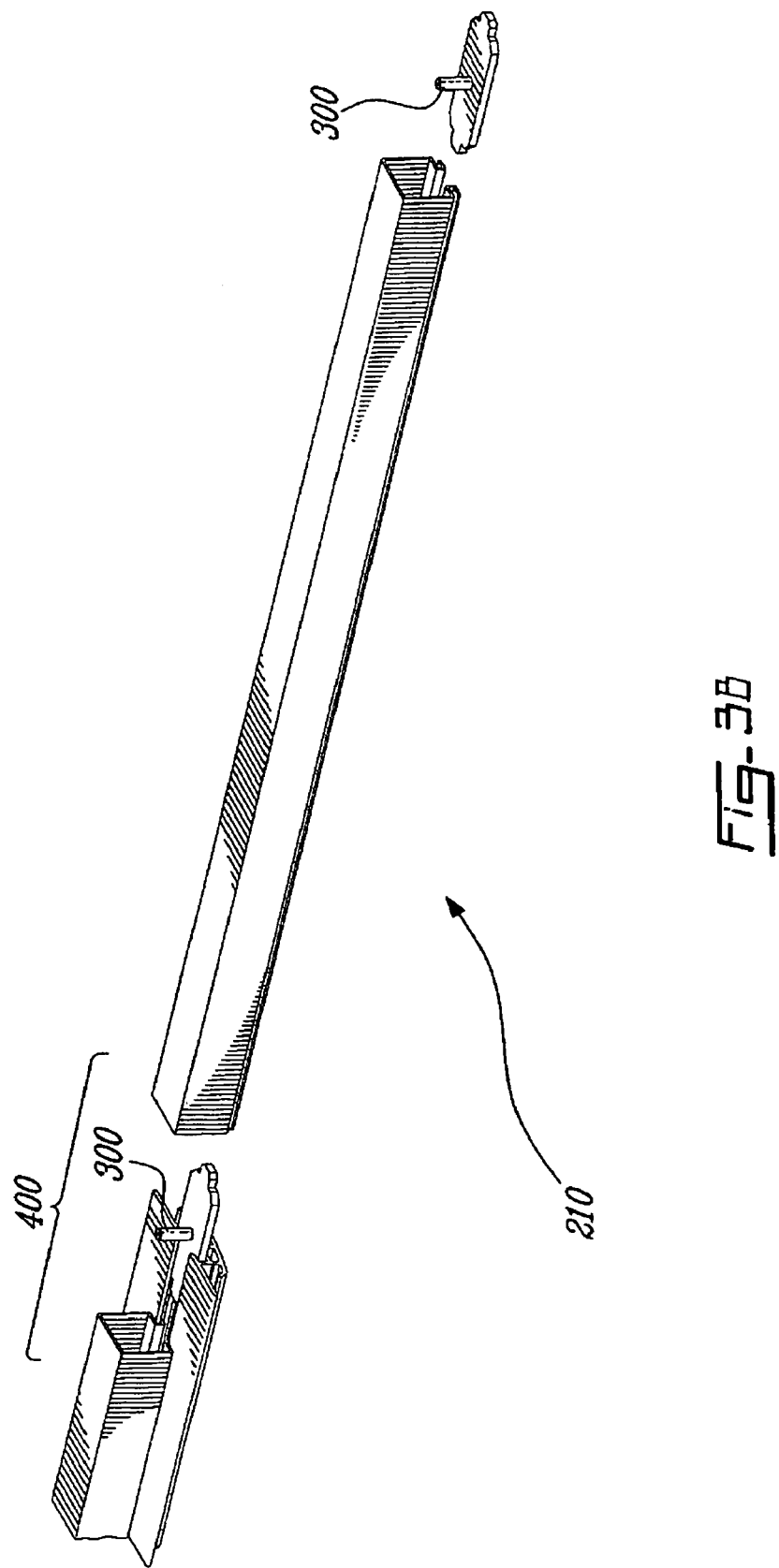

STRUCTURAL UNITS ADAPTABLE TO PREEXISTING CHASSIS AND VEHICLE ASSEMBLED THEREFROM

CROSS REFERENCE TO RELATED APPLICATIONS

This application claims priority on U.S. provisional application No. 60/730,863, filed on Oct. 28, 2005. All documents above are herein incorporated by reference.

FIELD OF THE INVENTION

The present invention relates to vehicles. More specifically, the present invention is concerned with structural units, comprising multifunctional structural members rigidly assembled together, the structural units fitting to a range of preexisting chassis, to yield vehicles tailored to specific needs.

SUMMARY OF THE INVENTION

There is provided a structural unit for a body of a vehicle, comprising bows spaced along a length of the structural unit and assembled using an optimized number of prefabricated structural members located along a length of the assembly of bows, said structural members maintaining a spacing between consecutive bows and providing rigidity to the assembly of bows, as well as providing at least one of: finish surfaces, supports and anchorage surfaces for finish elements, and supports and anchorage surfaces for accessory elements, yielding a finished rigid structural unit integrating at least one door.

There is further provided a vehicle, comprising a pre-existing chassis and a body comprising independent structural units assembled together, the independent structural units comprising at least a structural unit for a body of a vehicle comprising bows spaced along a length of the structural unit and assembled using an optimized number of prefabricated structural members located along a length of the assembly of bows, the structural members maintaining a spacing between consecutive bows and providing rigidity to the assembly of bows, as well as providing at least one of: finish surfaces, supports and anchorage surfaces for finish elements, and supports and anchorage surfaces for accessory elements, yielding a finished rigid structural unit integrating at least one door.

There is further provided a method for assembly of a vehicle with a preexisting chassis, comprising the steps of providing independent structural units; assembling the independent structural units together into a body of the vehicle; and securing the body to the preexisting chassis; wherein the step of providing independent structural units comprises providing at least a structural unit for a body of a vehicle comprising bows spaced along a length of the structural unit and assembled using an optimized number of prefabricated structural members located along a length of the assembly of bows, the structural members maintaining a spacing between consecutive bows and providing rigidity to the assembly of bows, as well as providing at least one of: finish surfaces, supports and anchorage surfaces for finish elements, and supports and anchorage surfaces for accessory elements, yielding a finished rigid structural unit integrating at least one door.

There is provided a kit for assembling a target structural unit for a body of a vehicle, comprising bows and prefabricated multifunctional members for assembling the bows into a rigid longitudinal assembly of bows; wherein a number and a size of each prefabricated structural member is determined as a function of a rigidity and a finish of the target structural unit.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 illustrate sliding connections in a) wall extrusion and b) ceiling extrusion assemblies according to an embodiment of the present invention;

DESCRIPTION OF EMBODIMENTS OF THE INVENTION

Figure 1:
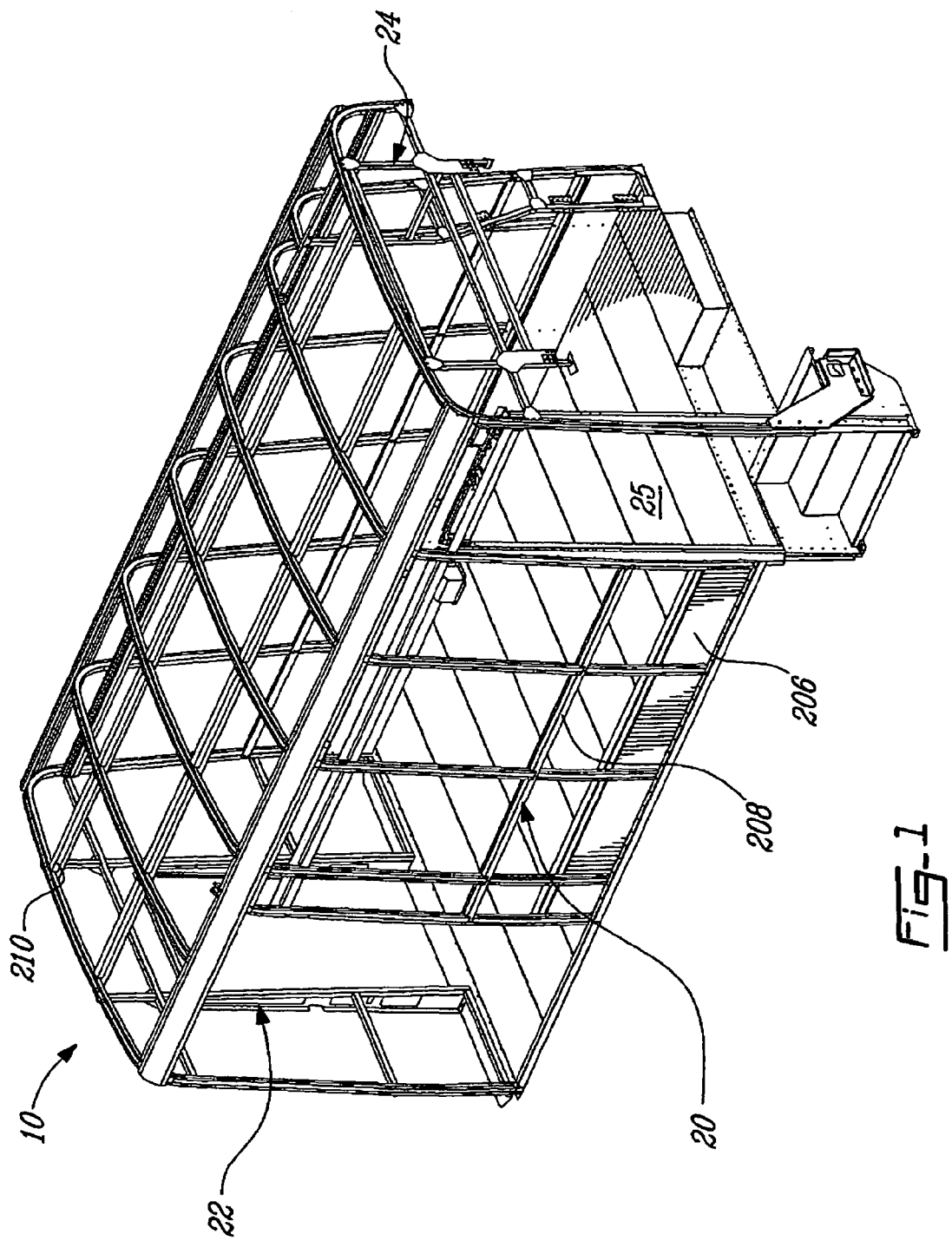
FIG. 1 illustrates a frame structure according to an embodiment of the present invention.

A frame structure for a vehicle may comprise, as illustrated in FIG. 1 of the appended drawings, a central structural unit 20, and for example, a back structural unit 22 and a front structural unit 24.

Figure 2:
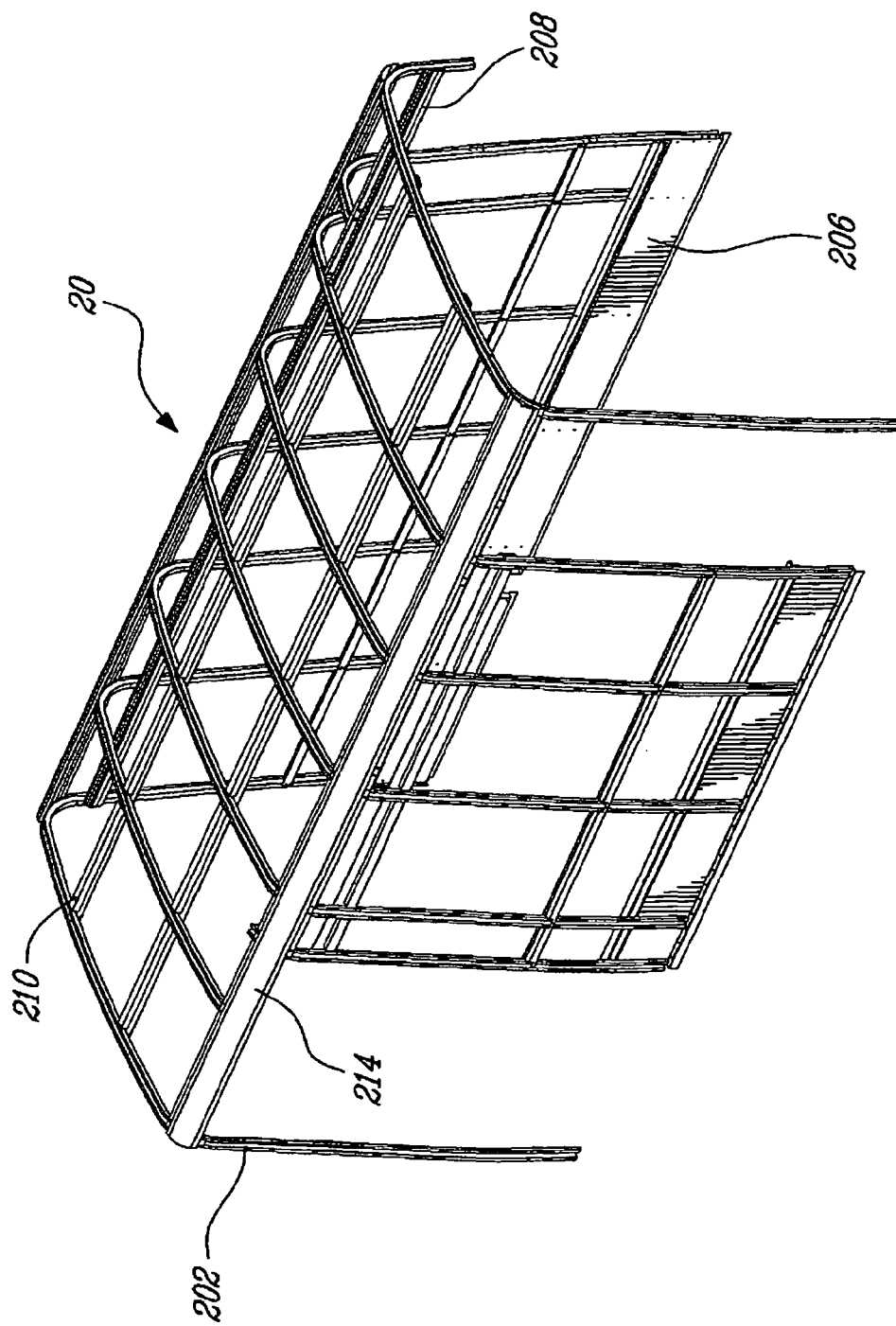
FIG. 2 illustrates a central structural unit of the frame structure of FIG. 1.

As detailed in FIG. 2, the central structural unit 20 is typically a riveted and bolted assembly comprising an assembly of bows 202 extending transversely across the top of the unit, spaced at intervals along the length of the unit 20 and secured by a number of structural members.

The bows 202, which are typically rolled formed metallic bows, ensure the vertical rigidity of the central structural unit 20.

The bows 202 are precisely positioned at desired locations along the length of the central unit 20 by an upper side member 214 located on each side of the central unit 20 in an upper region of the assembly of bows 202. Side plates 206 along the sides of the bow assembly further contribute to the positioning of the bows.

The bows 202, upper side members 214 and side plates 206 may be pre-perforated to allow a precise and easy connection. The distance between two bows 202 along the length of the central unit may be different according to specific localised needs of the structure.

The upper side members 214 are typically rolled formed metallic members.

The upper side members 214 form continuous longitudinal structural elements on both sides along the length of the central structural unit, and contribute to the longitudinal and transverse rigidity thereof.

The upper side members 214 allow accommodating apertures for access doors for wheelchairs for example, while maintaining the rigidity of the central structural unit 20.

Figure 6:
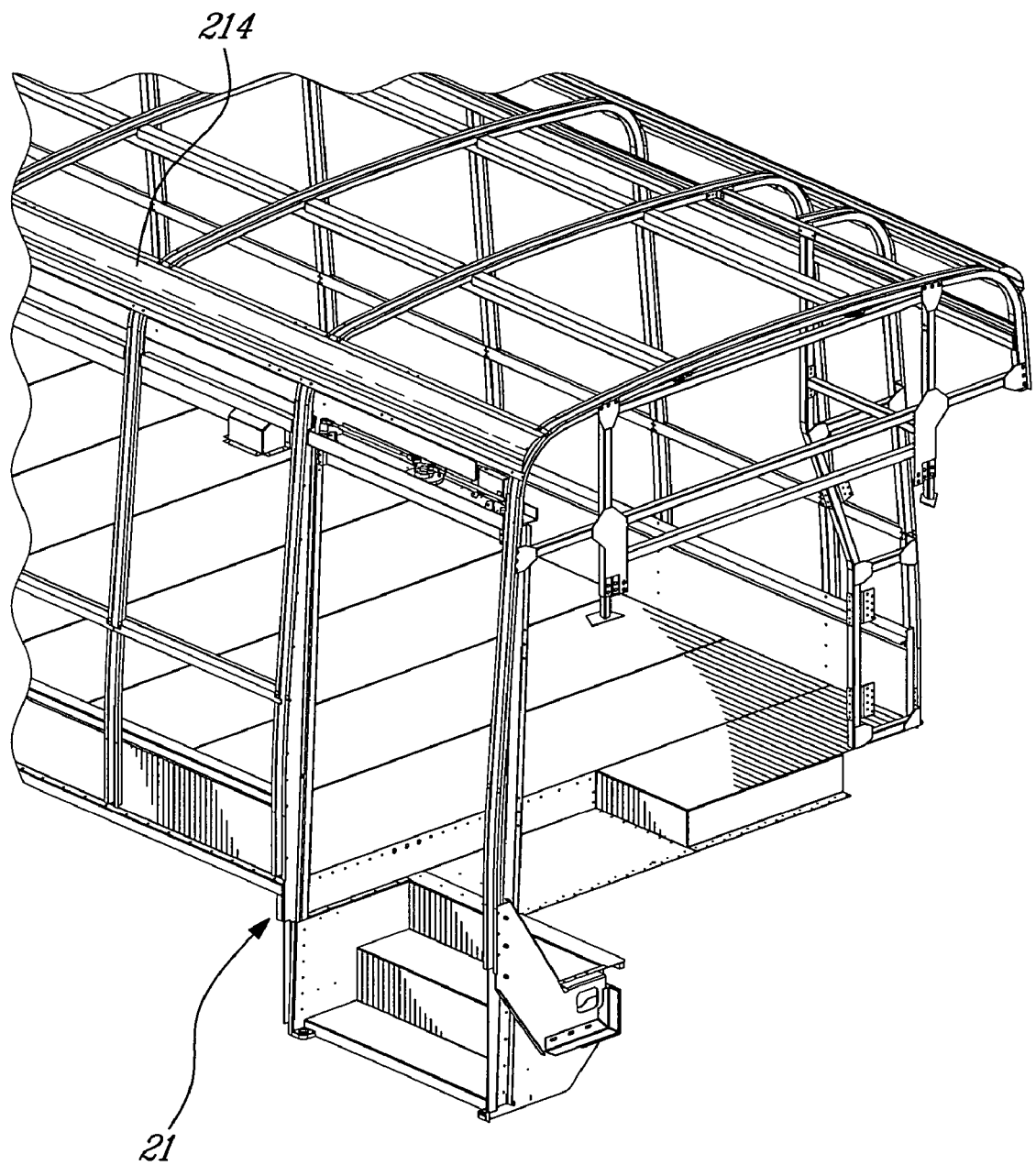
FIG. 6 illustrates a doorframe suspended from a frame structure according to an embodiment of the present invention.

The upper side members 214 provide a rigidity to the assembly of bows allowing the complete assembly of a doorframe 21 by suspension thereof from the frame structure (FIG. 6), instead of by resting on the pre-existing chassis for support, as is usually done in the art.

Figure 5:
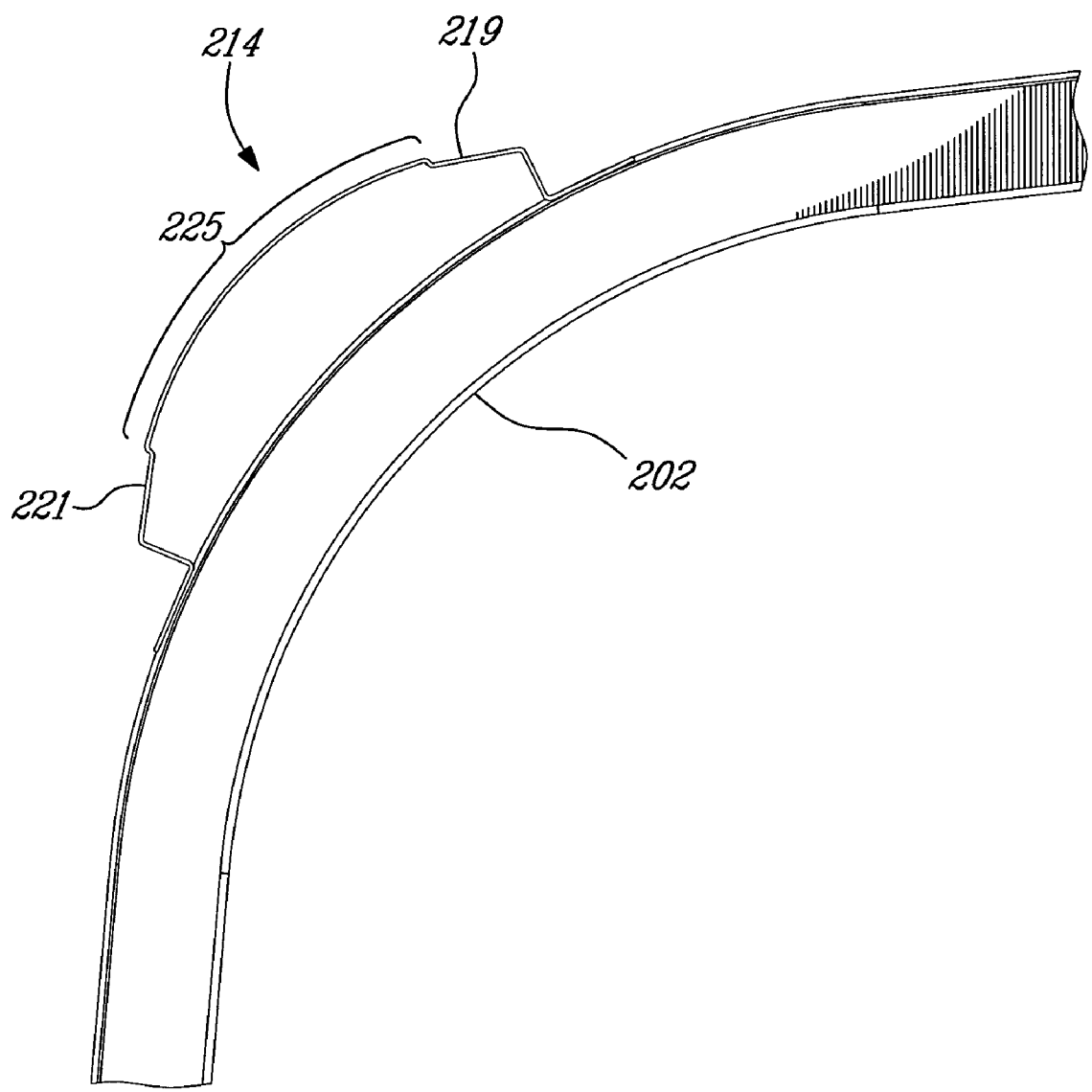
FIG. 5 illustrates an upper side member (in cross section) secured to a bow (in cross section) according to an embodiment of the present invention.

The upper side members 214, positioned on an exterior side of the bows 202, may also have an exterior finish function, a surface 225 thereof being an exterior apparent surface as shown in FIG. 5.

As also shown in FIG. 5, the upper side members 214, positioned on an exterior side of the bows 202, may be used to secure the main roof skin of the envelope of the body (not shown, discussed hereinbelow) by providing a connecting zone 219, and a side roof skin of the envelope of the body (not shown, discussed hereinbelow) by providing a side roof skin connecting zone 221, thereby forming a gutter.

The upper side members 214 therefore are multifunctional structural members.

The side plates 206, which further position the bows 202 and contribute to the longitudinal rigidity of the central structural unit 20, may provide a vertical supporting surface for passenger seats. The side plates 206 may further form part of a connection with an independent floor assembly 25.

The provision of pre-perforated side plates 206 and pre-perforated upper side members 214 may allow precisely positioning and squaring the central structural unit 20 without the need for an assembling jig.

Figure 4A:
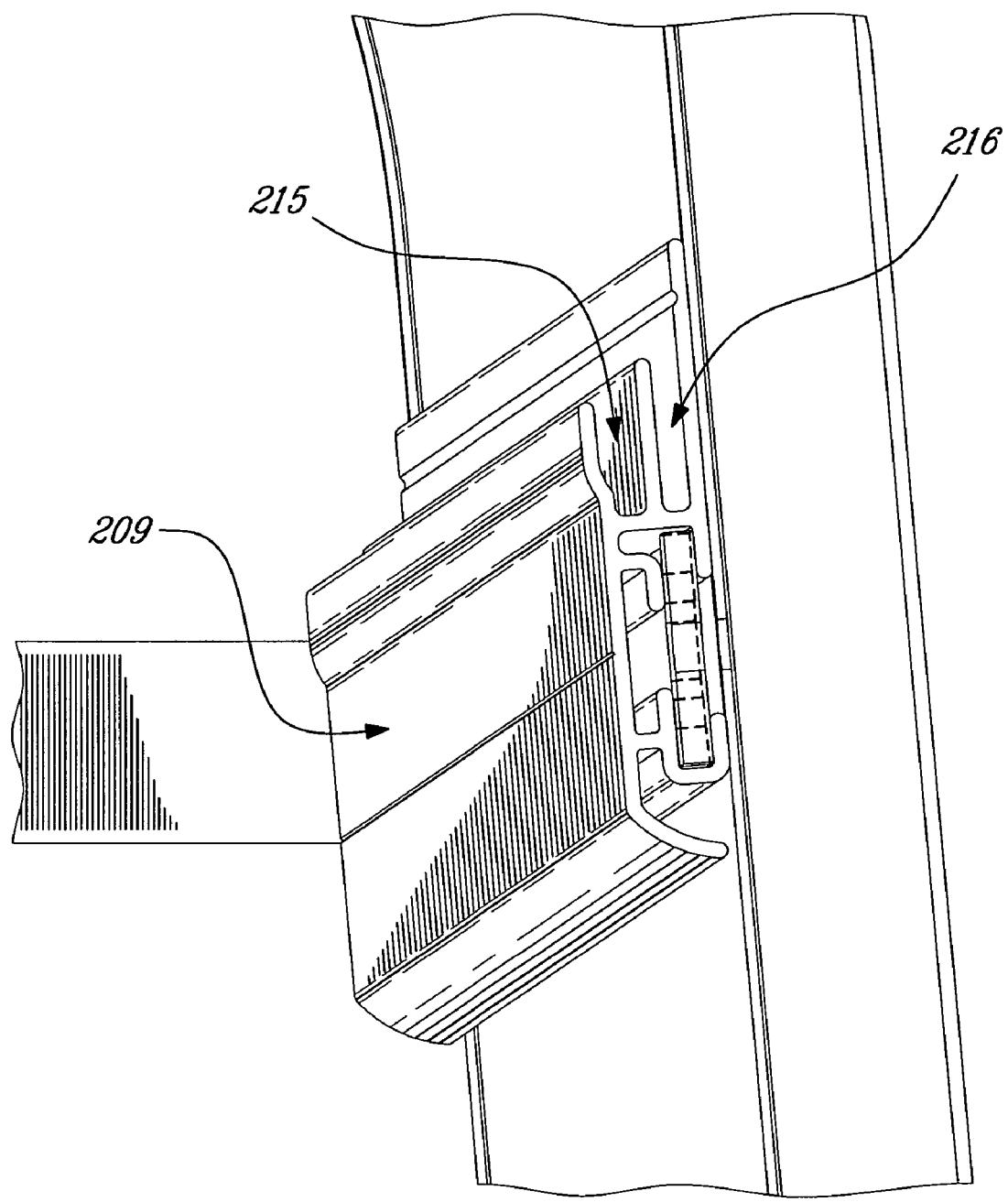
FIG. 4 illustrate details of sliding connections in a wall extrusion assembly according to an embodiment of the present invention.
Figure 4B:
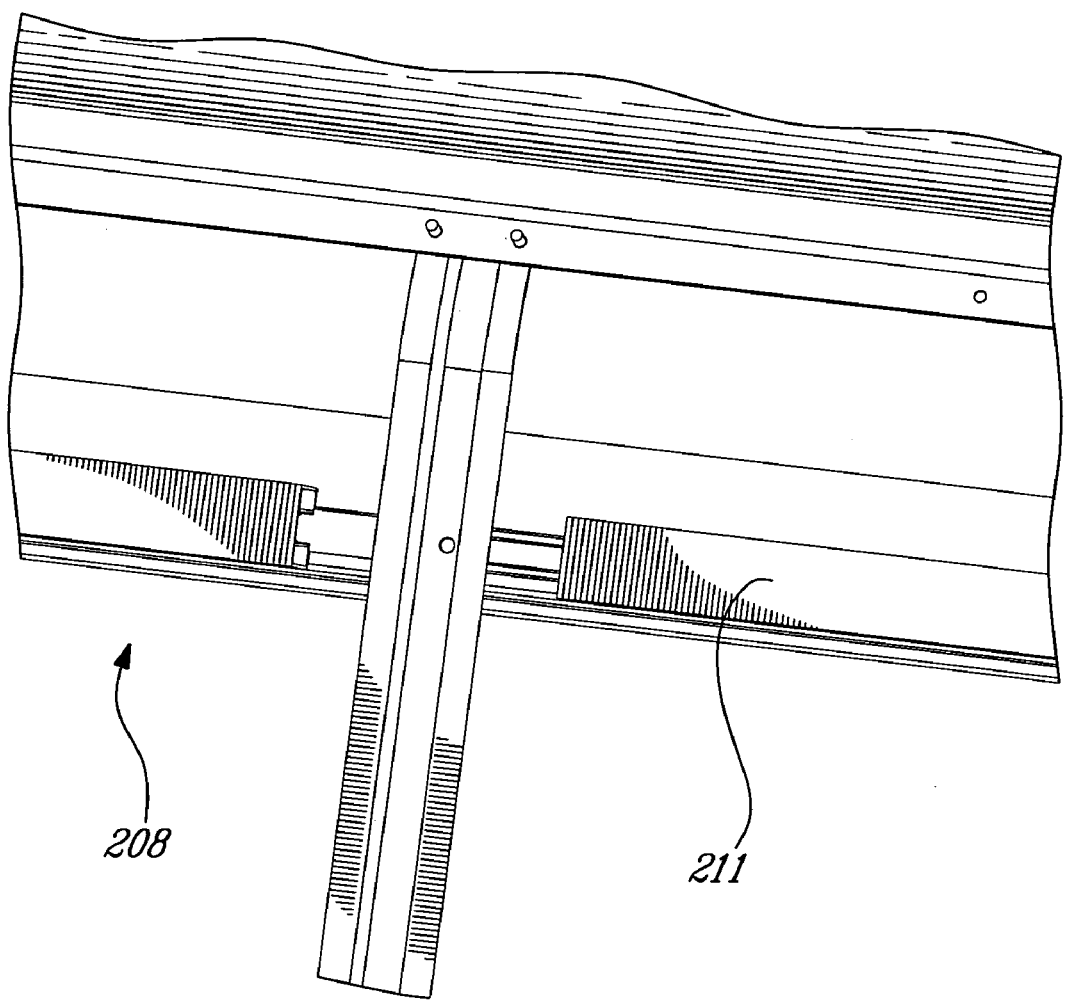
Figure 4C:
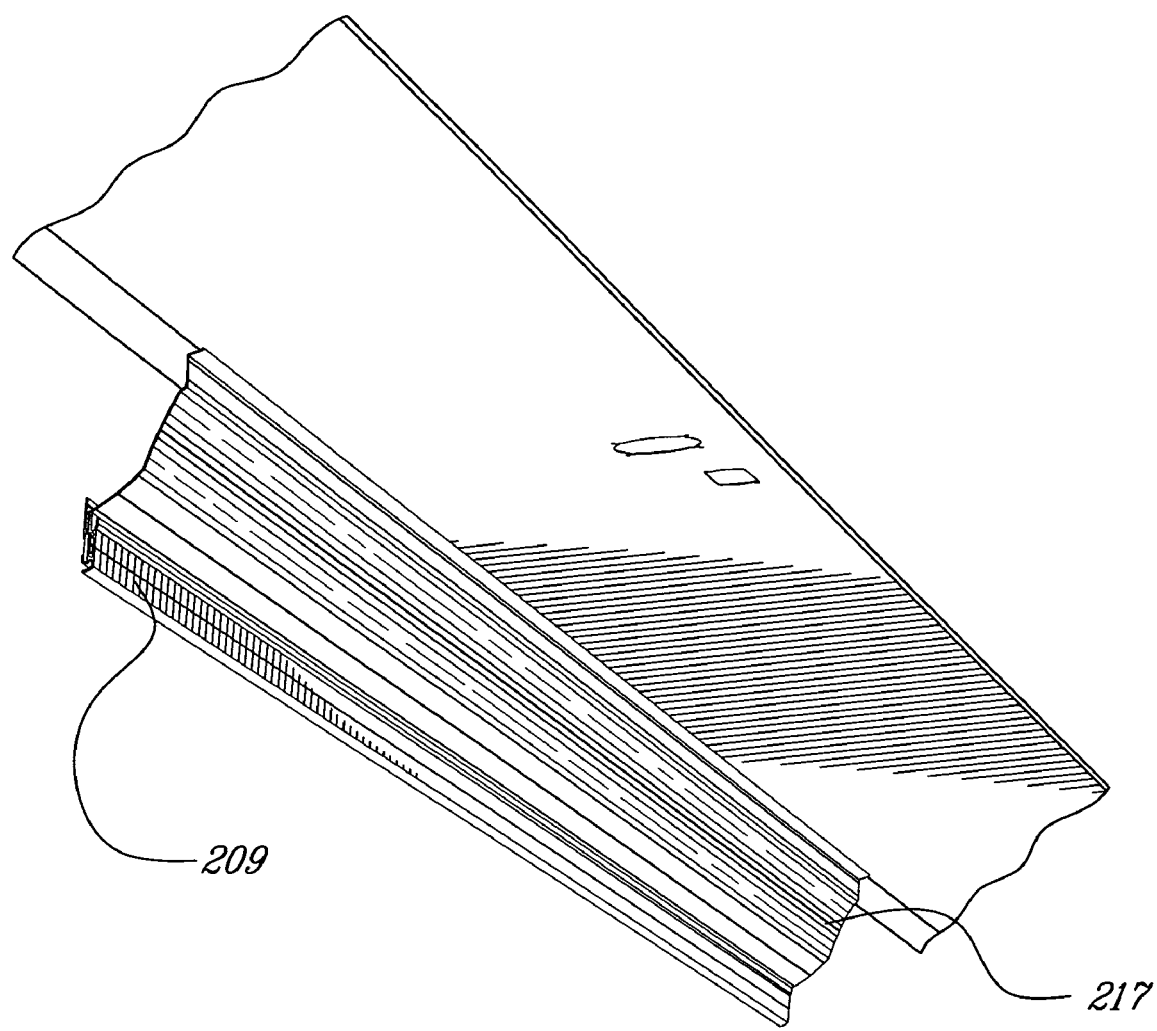

Other structural members used along the bow assembly include extrusions, which may be easily and time-effectively assembled by sliding connections 400 as illustrated in FIGS. 3a, 3b and 4 and detailed hereinbelow.

FIGS. 3a and 4 illustrate a wall extrusion assembly 208 as a free assembly of a main extrusion plate 209, bolting plates 213 and secondary extrusion plates 211, with sliding connections 400 as discussed above. The wall extrusion assemblies 208 provide supports and anchorage surfaces for finish elements, such as, for example, passenger restraints, luggage carriers or posts; and grooves 215 for accommodating wiring cover, grooves 216 for receiving ceiling skins. The wall extrusions 208 may also be used for securing the exterior side roof skin secured at an upper region of the side of the assembly of bows by the upper side members 214, as discussed hereinabove.

Each extrusion 208, 210 comprises an extrusion plate 209, assembled to secondary extrusion plates 211, the secondary extrusion plates 211 sliding inside the extrusion plate 209. The secondary extrusion plates 211 typically have a length corresponding to a spacing between two consecutive bows along the length of the assembly. They are separated by bolting plates 213 sliding inside the main extrusion plate, each bolting plate provided with a fastener 300 (as seen in the FIG. 3) for assembling to a bow.

Similarly, the ceiling extrusions assemblies 210, as shown in FIG. 3b, are typically free assemblies of a main extrusion, bolting plate, and secondary extrusion plates. They provide supports and anchorage surfaces for finish elements, such as interior posts, monitor supports, skins, luggage carriers or air conditioning elements for example.

As seen in FIGS. 1 and 2, ceiling extrusions 210 are continuous along the length of the bow assembly, whereas wall extrusions 208 may be discontinued to accommodate side openings such as doors for example.

Such extrusions contribute to the longitudinal rigidity of the central structural unit 20 and maintain the spacing of the bows 202. They may also be used as supports and anchorage surfaces for finish elements, and supports and anchorage surfaces for accessory elements.

From the foregoing, it should now be apparent that the structural members of the present central structural unit are multifunctional, since they ensure the desired longitudinal and transverse rigidity of the central structural unit 20, as well as providing supports and anchorage surfaces for finish elements and/or for accessory elements, or having themselves a surface finish function, while allowing integrating apertures for doors for example, as described hereinabove.

Each one of the structural members described hereinabove may be easily varied in number, dimension, position in relation to the assembly of bows, and arrangement, to meet the intended use of the final vehicle, which is to be assembled from the pre-existing chassis.

A number of such structural members, a well as their dimension and shape, determined in relation to a target structural unit to be assembled therefrom may be fabricated cost effectively and delivered in kits containing a predetermined number of each of them and a corresponding number of bows for example, for assembly, on an assembly line, in a cost effective way, into the target structural unit. No further finish step is required, since the structural members themselves provide finish surfaces and/or supports and anchorage surfaces for finish elements and/or for accessory elements.

Therefore, providing an optimized number of multifunctional prefabricated structural members and connecting members, a range of rigid structural units may be easily and cost effectively assembled.

Once thus assembled, the central structural unit 20 may be assembled with a back structural unit 22 and a front structural unit 24, which may play the role of interfaces between the central structural unit 20 and a floor 25 subsequently assembled or the pre-existing chassis, respectively, as generally shown in FIG. 1. Each structural unit 20, 22, 24 may be tailored independently of a type of pre-existing chassis, with a reduced number of structural elements required to achieve target objectives of rigidity, security, imperviousness, exterior and interior finish, time and ease of fabrication and of assembly.

The structural units of the frame structure of FIG. 1 may be assembled in a cost effective way on an assembly line, each one of them comprising an optimized number of structural members, variation of the final assembly thereof being possible by varying the number, dimension, and arrangement of each of these structural members, to meet the intended use of the final vehicle, to be assembled from the pre-existing chassis. Assembly does not use any jig, a reduced number of structural members and connections as described hereinabove ensuring a high precision of assembly, using connections allowing a time-effective assembly, a high dimensional precision, while ensuring the rigidity of the overall assembly. An overall number of components is reduced, since the structural members themselves may provide finish surfaces, supports and anchorage surfaces for finish elements and for accessory elements, and apertures as explained hereinabove.

The frame structure of FIG. 1 is typically covered by a body envelope (not shown), including a main roof skin on top of the frame structure and a side roof skin on an upper part of the sides thereof (typically in the region above window frames for example) as known in the art.

A floor structure, independent from the frame structure, may be assembled to the frame structure, and allow easily and effectively securing passenger seats, with a sub floor providing a mechanical interface between the floor structure and the pre-existing chassis, for example.

Accessory units, independent from the frame structure, may be further assembled to the frame structure, without modifying the frame structure, according to the type of floor, pre-existing chassis and intended use of the final vehicle to be assembled from this pre-existing chassis.

The assembled frame structure of FIG. 1, including an integrated doorframe and covered with a body envelope and further assembled to a floor assembly as described hereinabove for example, may be then assembled to a preexisting chassis, at a final stage of assembly, into a final vehicle.

As people in the art will appreciate, the final vehicle may be a self-propelled, boosted, or towed conveyance for transporting a burden on land for example.

Although the present invention has been described hereinabove by way of embodiments thereof, it may be modified, without departing from the nature and teachings of the subject invention as defined in the appended claims.

What is claimed:

1. A central structural unit for a vehicle, comprising bows extending transversally across a top of the central structural unit, spaced at intervals along a length of the central structural unit, said bows being supported on a floor level of the vehicle and secured together at an upper part thereof by continuous longitudinal structural members;
    wherein said continuous longitudinal structural members comprise extrusions assembled by sliding connections, said sliding connections being formed of main extrusion plates and secondary extrusion plates sliding into said main extrusion plates, said consecutive secondary extrusion plates being separated by bolting plates sliding into said main extrusion plates; said continuous longitudinal structural members maintaining a spacing between consecutive bows and providing rigidity to the assembly of bows.

2. The structural unit of claim 1, said continuous longitudinal structural members further comprising rolled formed metallic members.

3. The structural unit of claim 1, assembled to an independent floor structure.

4. The structural unit of claim 1, assembled to independent accessory units.

5. The structural unit of claim 1, wherein said bows are rolled formed metallic bows, and said structural members comprise rolled formed metallic members and extrusions.

6. The structural unit of claim 1, wherein said secondary extrusion plates have a length corresponding to a spacing between two consecutive bows, said bolting plates allowing assembling to the bows.

7. The structural unit of claim 6, wherein each bolting plate is provided with a fastener for assembly to a bow.

8. The structural unit of claim 1, wherein said continuous longitudinal structural members comprise an upper side member on each upper side of the assembly of bows.

9. The structural unit of claim 1, said assembly of bows accommodating at least one aperture for a door.

10. The structural unit of claim 8, wherein said upper side members form continuous longitudinal structural elements on each upper side along a length of the structural unit.

11. The structural unit of claim 1, wherein said bows and continuous longitudinal structural members are pre-perforated.

* * * * *